United States Patent [19]

Tamura

[11] Patent Number: 5,897,740
[45] Date of Patent: Apr. 27, 1999

[54] PLASMA PROCESSING SYSTEM

[75] Inventor: Takahiro Tamura, Tokyo, Japan

[73] Assignee: Anelva Corporation, Tokyo, Japan

[21] Appl. No.: 08/651,878

[22] Filed: May 21, 1996

[30] Foreign Application Priority Data

May 30, 1995 [JP] Japan ................................. 7-156976

[51] Int. Cl.$^6$ .......................... H01L 21/302; B44C 1/22; C03C 15/00
[52] U.S. Cl. .................. 156/345; 134/104.1; 118/723 R
[58] Field of Search .......................... 156/345; 134/104.1; 118/723 R

[56] References Cited

U.S. PATENT DOCUMENTS

| | | | |
|---|---|---|---|
| 5,662,770 | 9/1997 | Donohoe | 438/716 |
| 5,662,819 | 9/1997 | Kadomura | 438/711 |
| 5,667,701 | 9/1997 | Sato et al. | 216/61 |
| 5,683,539 | 11/1997 | Quian et al. | 156/345 |

*Primary Examiner*—John M. Ford
*Assistant Examiner*—Pavanaram K. Sripada
*Attorney, Agent, or Firm*—Sughrue, Mion, Zinn Macpeak & Seas, PLLC

[57] ABSTRACT

A system for processing a substrate with plasma. In the system, a substrate holder includes an energy application member for energizing an exposure face other than a substrate placement portion. The energy application member energizes the exposure face by an induced current when high-frequency electromagnetic wave power is applied, by heat generated upon energization, or by ion bombardment when a high-frequency electric field is applied. Perfluorocarbon 14 gas and oxygen gas introduced by a gas introduction mechanism form plasma by a power supply mechanism for etching and removing a thin film deposited on the exposure face. At this time, the etching is accelerated by energy given by the energy application member.

13 Claims, 8 Drawing Sheets

PLASMA PROCESSING SYSTEM

BACKGROUND OF THE INVENTION

1. Field of the Invention

This invention relates to a system for processing a substrate with plasma and in particular to a plasma processing system such as a plasma enhanced chemical vapor deposition (PECVD) system or a plasma etching system.

2. Description of the Related Art

Figure 11:
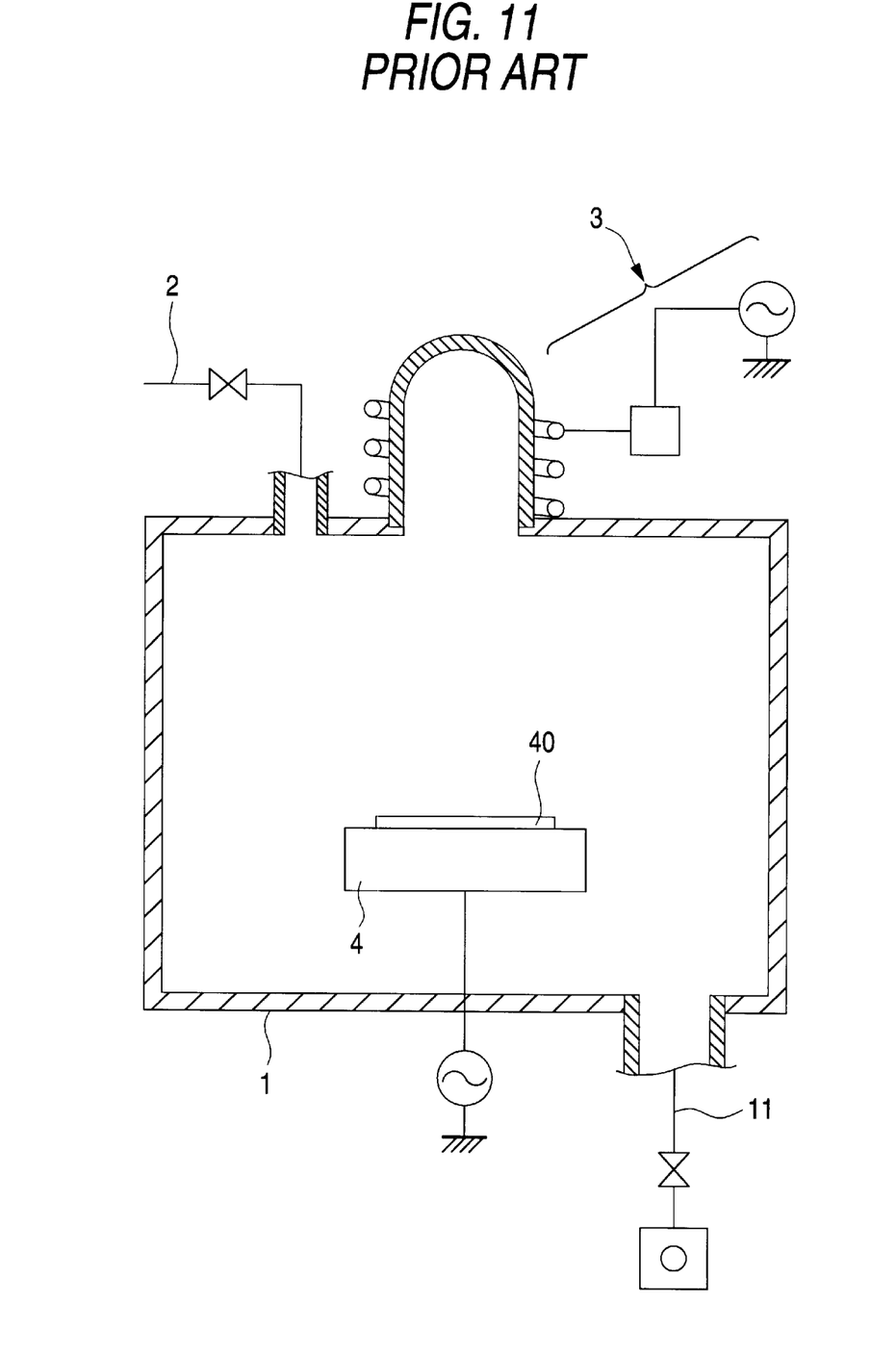
FIG. 11 is a schematic view showing a conventional plasma processing system.

To manufacture a semiconductor integrated circuit, a liquid crystal display or the like, plasma is used to apply predetermined processing to the surface of a substrate. FIG. 11 is an illustration showing a schematic configuration of a conventional plasma processing system used for such processing.

The plasma processing system shown in FIG. 11 consists mainly of a vacuum vessel 1 provided with an exhaust channel 11, a gas introduction mechanism 2 for introducing a predetermined gas into the vacuum vessel 1, a power supply mechanism 3 for energizing the introduced gas for forming plasma, and a substrate holder 4 for placing a substrate in a position where the substrate is to be processed with the formed plasma.

The system in FIG. 11 carries a substrate 40 into the vacuum vessel 1 through a gate valve (not shown) and places the substrate 40 on the substrate holder 4. After evacuating air in the vacuum vessel 1 through the exhaust channel 11, the system introduces a predetermined gas by the gas introduction mechanism 2. Next, the system applies energy of high-frequency electromagnetic wave power and the like, to the gas in the vacuum vessel 1 by the power supply mechanism 3 for forming plasma. Then, the system applies predetermined processing to the surface of the substrate 40 with the formed plasma. For example, if mono-silane gas and oxygen gas are introduced by the gas introduction mechanism 2, the plasma causes a decomposition reaction and the like, and PECVD processing can be performed for depositing a silicon oxide thin film on the surface of the substrate 40.

When the processing for the substrate 40 is repeated a considerable number of times in the conventional plasma processing system, a phenomenon appears in which a thin film is also deposited on the surface of the portion exposed to the plasma in the surface of the substrate holder 4 (which will be hereinafter referred to as exposure face in the specification), and the inner face of the vacuum vessel 1. For a film depositing system such as a PECVD system, the deposited film is often the same as the thin film deposited on the substrate. For a plasma etching system, etched material may adhere and grow into a thin film.

If such a thin film reaches a considerable film thickness, it peels off due to the internal stress of the thin film. The peeled thin film causes fine powder drifting in the vacuum vessel to occur. If the fine powder adheres to the substrate 40, it causes a surface blemish to occur, degrading the commodity value of the thin film deposited on the surface of the substrate or causing a serious circuit failure to occur.

To suppress such deposited film peeling, a plasma cleaning technique is generally used for etching and removing the deposited film before peeling. This technique is executed during intervals between substrate processing steps. In the technique, for example, mixed gas of perfluorocarbon 14 gas ($CF_4$):oxygen gas=80:20 or so is introduced into the vacuum vessel 1 by the gas introduction mechanism 2, the power supply mechanism 3 is operated for forming plasma of the mixed gas, and the deposited film is etched by radical CFx (x=1, 2, or 3), CFx ions (x=1, 2, or 3), radical fluorine, or fluorine ions generated in the plasma. That is, fluorine radicals or ions react with the deposited thin film to yield volatile substance, which is then discharged through the exhaust channel 11, thereby removing the thin film.

However, even if such plasma cleaning as described above is executed, it is difficult for the configuration of the conventional plasma processing system to etch and remove the thin film deposited on the exposure face of the substrate holder; even if the plasma cleaning is executed for a predetermined time, a thin film often remains on that portion. If an attempt is made to completely remove the thin film on the exposure face, the plasma cleaning must be executed for a long time. The fact that it takes a long time in such operation performed during intervals between substrate processing steps will cause the system availability to lower.

SUMMARY OF THE INVENTION

It is therefore an object of the invention to provide a plasma processing system which can accelerate etching and removal of a deposited film on the exposure face of a substrate holder when executing plasma cleaning to shorten the entire time required for the plasma cleaning.

In attaining the above object, the invention provides a plasma processing system comprising: a vacuum vessel provided with an exhaust channel; a gas introduction mechanism for introducing a predetermined gas into the vacuum vessel; a power supply mechanism for energizing the introduced gas for forming plasma; and a substrate holder for placing a substrate in a position where the substrate is to be processed with the formed plasma, wherein the gas introduction mechanism is adapted to introduce gas for executing plasma cleaning for plasma etching and removing a thin film deposited on an inner face of the vacuum vessel and an exposure face other than a substrate placement portion of the substrate holder, and wherein the substrate holder includes an energy application member for energizing the exposure face of the substrate holder when the plasma cleaning is executed.

DETAILED DESCRIPTION OF THE PREFERRED EMBODIMENTS

Referring now to the accompanying drawings, there are shown preferred embodiments of the invention.

First Embodiment

Figure 1:
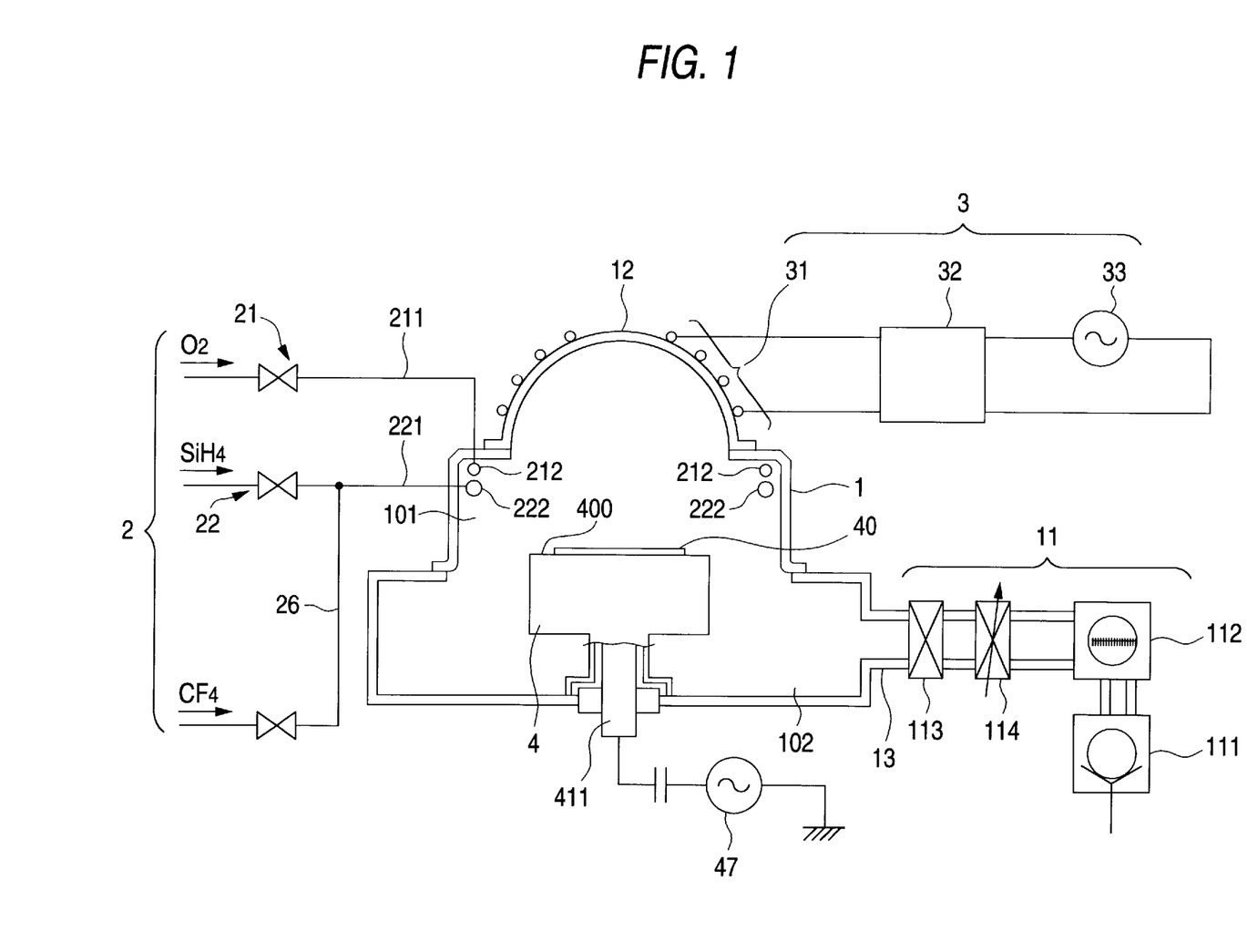
FIG. 1 is a schematic view showing a plasma processing system according to a first embodiment of the invention.

FIG. 1 is a schematic view showing a plasma processing system according to a first embodiment of the invention.

Like the system shown in FIG. 11, the plasma processing system shown in FIG. 1 comprises a vacuum vessel 1 provided with an exhaust channel 11, a gas introduction mechanism 2 for introducing a predetermined gas into the vacuum vessel 1, a power supply mechanism 3 for energizing the introduced gas for forming plasma, and a substrate holder 4 for placing a substrate on which a thin film is to be deposited.

The vacuum vessel 1 comprises a film depositing chamber 101 and an air evacuating chamber 102 having a little large space positioned below the film depositing chamber 101. The part defining the film depositing chamber 101 and the part defining the air evacuating chamber 102 can be separated from each other for maintenance of the members in the vacuum vessel 1 and the like.

The container wall of the vacuum vessel 1 in the part of the film depositing chamber 101 is provided with a gate valve (not shown) and the container wall in the part of the air evacuating chamber 102 is provided with an exhaust pipe 13 to which the exhaust channel 11 is connected. The exhaust channel 11 consists mainly of a roughing vacuum pump 111, a main pump 112 placed at the stage preceding the roughing vacuum pump 111, and a main valve 113 and a variable conductance valve 114 placed on an exhaust path for exhausting by the pumps 111 and 112.

The vacuum vessel 1 has a bell jar 12 on the top thereof. A circular opening is made at the center of the upper container wall of the vacuum vessel 1 and the bell jar 12 is connected to the opening in airtight relation. The bell jar 12 has a dome shape of about 200 mm in diameter and is made of a dielectric material such as silica glass.

In the example shown in FIG. 1, the gas introduction mechanism 2 comprises two gas introduction channels 21 and 22 so that it can introduce two different gases at the same time. The gas introduction channel 21 (22) consists mainly of piping 211 (221) connected to a tank (not shown) and a gas introduction body 212 (222) connected to the end portion of the piping 211 (221).

Figure 2:
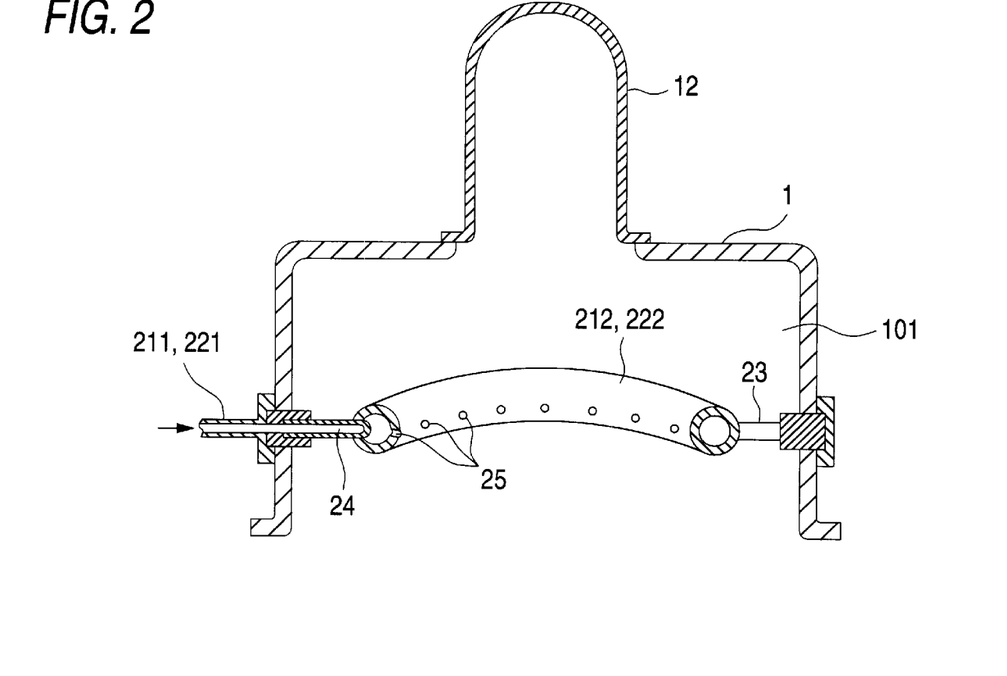
FIG. 2 is a view showing the structure of a gas introduction body in the system of FIG. 1.

FIG. 2 is a view showing the structure of the gas introduction body. As shown in FIG. 2, the gas introduction body 212, 222 is made of an annular pipe having a circular cross section. It is supported by a support rod 23 disposed in the vacuum vessel 1 and is placed horizontally along the inner face of the vacuum vessel 1. The vacuum vessel 1 may be cylindrical or square-tubular.

Further, a transport pipe 24 is provided in a state in which it passes through the wall of the vacuum vessel 1 in airtight relation; it is connected at one end to the gas introduction body 212, 222 and at the other end to the piping 211, 221 in FIGS. 1 and 2.

As shown in FIG. 2, the gas introduction body 212, 222 has gas spouting holes 25 on the inner side face. The gas spouting holes 25 are openings each having about 0.5 mm in diameter and disposed on the peripheral surface at intervals of about 10 mm.

On the other hand, referring again to FIG. 1, the power supply mechanism 3 consists mainly of a high-frequency coil 31 placed surrounding the bell jar 12, and a high-frequency electromagnetic wave power supply 33 for supplying high-frequency electromagnetic wave power via a matching box 32 to the high-frequency coils 31. For example, a device for generating high-frequency electromagnetic wave power of 13.56 MHz is adopted as the high-frequency electromagnetic wave power supply 33; the high-frequency electromagnetic wave power is supplied from the high-frequency coil 31 to the bell jar 12.

Figure 3:
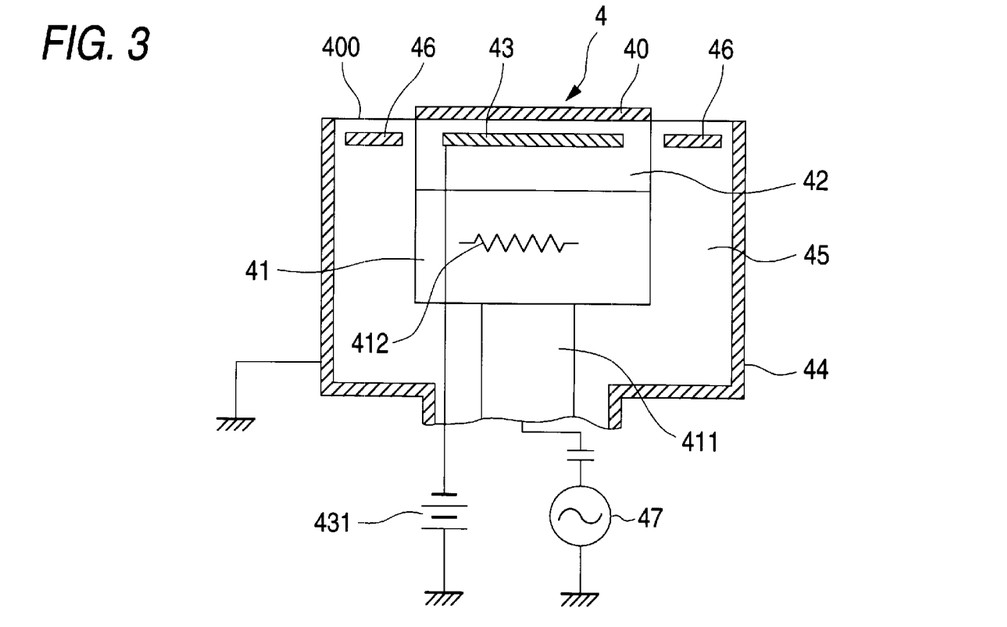
FIG. 3 is a schematic sectional view showing the structure of a substrate holder adopted for the system of FIG. 1.

The substrate holder 4 is disposed below the bell jar 12 in the vacuum vessel 1. FIG. 3 is a schematic sectional view showing the structure of the substrate holder 4 adopted for the system of FIG. 1.

As shown in FIGS. 1 and 3, the substrate holder 4, which is provided to place a substrate 40 to be processed on the surface thereof, consists mainly of a holder main body 41 made of metal, a chucking dielectric block 42 placed on the top of the holder main body 41, a chucking electrode 43 embedded in the chucking dielectric block 42, a shield plate 44 placed so as to cover the surroundings of the holder main body 41 and the chucking dielectric block 42, an insulation block 45 disposed so as to fill the space among the shield plate 44, the holder main body 41, and the chucking dielectric block 42, and an energy application member 46 embedded in the insulation block 45.

The holder main body 41 is a column-shaped member formed of metal such as aluminum. A holder strut 411 made of similar metal is fixed to the lower side of the holder main body 41. It passes through the vacuum vessel 1 in airtight relation, extends outside the vacuum vessel 1, and is supported by a structure (not shown) outside the vacuum vessel 1. An insulation material (not shown) intervenes between the vacuum vessel 1 and the holder strut 411 for insulating them.

A substrate high-frequency electromagnetic wave power supply 47 is connected to the holder main body 41. It is provided to apply a predetermined bias voltage to the substrate by the interaction between plasma and high frequency; for example, a 13.56-MHz, 2000-W power supply is adopted.

The holder main body 41 contains a temperature adjustment mechanism 412 as required. The temperature adjustment mechanism 412 is provided if the substrate 40 needs to be heated or cooled to a predetermined temperature during the processing of the substrate 40; it is adapted to circulate a gas or liquid heat medium or refrigerant on a passage defined in the substrate holder 4.

The chucking dielectric block 42 placed on the top of the holder main body 41 is a column-shaped member having an outer diameter similar to that of the holder main body 41 and is formed of a dielectric material such as ceramics consisting essentially of aluminum oxide such as alumina. The chucking electrode 43 is embedded in a position about 0.3 mm below the top face of the chucking dielectric block 42. A chucking power supply 431 is connected to the chucking electrode 43. When the chucking power supply 431 operates, the chucking electrode 43 dielectrically polarizes the portion of the chucking dielectric block 42 above the chucking electrode 43, causing static electricity to occur on the top face of the chucking dielectric block 42. The static electricity causes the substrate 40 to be electrostatically chucked.

On the other hand, the shield plate 44 is provided to prevent plasma from turning and going to the sides of the substrate holder 4 and producing high-frequency electromagnetic wave discharge. The shield plate 44 is a cylindrical member formed of metal such as aluminum and surrounds the holder main body 41 and the chucking dielectric block 42 with a predetermined gap therebetween. The shield plate 44 is grounded like the vacuum vessel 1.

The insulation block 45 for insulating the shield plate 44 from the holder main body 41 and the chucking dielectric block 42 is formed of an insulation substance such as a ceramic member consisting essentially of aluminum oxide. In the embodiment, the top face of the insulation block 45 is exposed to plasma and corresponds to the above-mentioned exposure face 400. The insulation block 45 is a cylindrical form of about 150 mm in inner diameter, about 200 mm in outer diameter, and about 60 mm in height.

The energy application member 46 in the embodiment is a flat annular member of about 160 mm in inner diameter, about 190 mm in outer diameter, and about 1 mm in height and is embedded in a position about 1 mm below the exposure face 400. In the embodiment, the energy application member 46 is made of a nickel alloy consisting of nickel and aluminum in a ratio of 9:1.

The dimensions of the parts of the substrate holder 4 are applied to an example where a substrate 40 having a 6-inch diameter is placed on the substrate holder 4. The dimensions vary depending on the size of the substrate 40, needless to say.

Next, the operation of the plasma processing system of the embodiment will be discussed.

First, the substrate 40 is carried into the vacuum vessel 1 through the gate valve (not shown) disposed in the vacuum vessel 1 and is placed on the substrate holder 4. The gate valve is closed and the exhaust channel 11 is operated for evacuating the vacuum vessel 1 to about 5 mTorr, for example.

Next, the gas introduction mechanism 2 is operated for introducing predetermined gases into the vacuum vessel 1 at a predetermined flow rate. At this time, the gases are supplied from the pipings 211 and 221 via the transport pipes 24 to the gas introduction bodies 212 and 222, and are spouted out and introduced into the vacuum vessel 1 through the gas spouting holes 25 of the gas introduction bodies 212 and 222. The introduced gases spread in the vacuum vessel 1 and reach the inside of the bell jar 12.

In this state, the power supply mechanism 3 is operated for applying about 13.56-MHz, 2000-W high-frequency electromagnetic wave power from the high-frequency electromagnetic wave power supply 33 via the matching box 32 to the high-frequency coil 31. At the same time, the substrate high-frequency electromagnetic wave power supply 47 is also operated for applying predetermined high-frequency electromagnetic wave power to the substrate holder 4.

The high-frequency electromagnetic wave power supplied by the power supply mechanism 3 is introduced into the bell jar 12 through the high-frequency coil 31 and energizes the gases existing in the bell jar 12 for producing plasma. The produced plasma spreads downward from the bell jar 12 to the substrate 40. The plasma is used to apply predetermined processing to the surface of the substrate 40. At this time, the electric field caused by the bias voltage generated by the interaction between the high-frequency electromagnetic wave power given by the substrate high-frequency electromagnetic wave power supply 47 and the plasma accelerates the ions in the plasma and causes the ions to collide with the substrate 40. The processing on the surface of the substrate 40 is efficiently executed by energy of the collision.

For example, for processing by depositing a silicon oxide thin film, oxygen gas is introduced through the first gas introduction channel 21 and mono-silane gas is introduced through the second gas introduction channel 22. Mono-silane is decomposed by mono-silane/oxygen plasma and reacts with oxygen to deposit a silicon oxide thin film.

In the system shown in FIG. 1, high-density plasma of $10^{10}$ cm$^{-3}$ or more can be produced in a region where the pressure in the vacuum vessel 1 is 100 mTorr or less, and a thin film can be deposited at a high film depositing rate with the high-density plasma.

As the thin film depositing process is repeated, a thin film is deposited on the inner face of the vacuum vessel 1 and the exposure face 400 of the substrate holder 4. When the process is repeated a considerable number of times, removal of the thin film is decided to be required and the following plasma cleaning is executed.

First, the completed substrate 40 is carried out, the 10 gate valve (not shown) is closed, and the exhaust channel 11 is operated for once evacuating the vacuum vessel 1, then a dummy substrate is carried into the vacuum vessel 1 through the gate valve and is placed on the substrate holder 4 like the substrate 40. The reason why the dummy substrate is placed is that if the surface of the substrate holder 4 in the portion on which the substrate 40 was placed is exposed directly to the etching gas, it is etched and eroded because no thin film is deposited on it.

Next, the exhaust channel 11 is again operated for evacuating the vacuum vessel 1 to about 0.1 Torr. Then, the gas introduction mechanism 2 is operated for introducing perfluorocarbon 14 gas at a flow rate of 400 SCCM and oxygen gas at a flow rate of 100 SCCM into the vacuum vessel 1. To introduce the perfluorocarbon 14 gas, for example, a piping 26 of the perfluorocarbon 14 gas may be provided and connected to the piping 221 of mono-silane gas used for thin film deposition or the piping 211 of plasma forming gas such as oxygen and their valves may be switched selectively.

The variable conductance valve 114 disposed in the exhaust channel 11 is controlled to hold the pressure in the vacuum vessel 1 at about 2 Torr. In this state, the power supply mechanism 3 and the substrate high-frequency electromagnetic wave power supply 47 are operated for introducing about 13.56-MHz, 2000-W high-frequency electromagnetic wave power into the bell jar 12, whereby plasma is formed in the bell jar 12 and the deposited film is etched and removed by radical CFx (x=1, 2, or 3), CFx ions (x=1, 2, or 3), radical fluorine, or fluorine ions generated in the plasma. That is, the fluorine radicals or ions react with the deposited thin film to yield volatile material, which is then discharged through the exhaust channel 11, thereby removing the thin film.

It is observed that the energy application member 46 made of the nickel alloy generates heat at a fairly high temperature during the plasma cleaning operation. The exposure face 400 of the substrate holder 4 is heated by the heat generated by the energy application member 46. Resultantly, the etching reaction on the exposure face 400 is accelerated, solving the conventional problems of the remaining thin film on the exposure face 400 after the plasma cleaning and prolonged plasma cleaning.

The reason why the nickel alloy embedded in the insulation material generates heat cannot be predicated, but it is conceivable that the fact that the nickel alloy is a magnetic material is related to the phenomenon. That is, the high-frequency electromagnetic wave power introduced through the high-frequency coil 31 to form plasma diffuses inside the vacuum vessel 1 and causes an induced current to occur in the energy application member 46. This induced current may change the direction of magnetization in the nickel alloy periodically for causing the nickel alloy to generate heat on a principle similar to that of electromagnetic induction heating.

In any way, the exposure face 400 can be energized by the simple structure of embedding the annular member in the substrate holder 4, contributing to a drastic reduction in costs.

In the embodiment, the substrate high-frequency electromagnetic wave power supply 47 is operated during the plasma cleaning and the high-frequency electromagnetic wave power introduced from the substrate high-frequency electromagnetic wave power supply 47 also causes the induced current to occur in the energy application member 46, thus the heating effect is furthermore improved. In this connection, when the power supply mechanism 3 was operated under the condition of 13.56 MHz and 2000 W and the substrate high-frequency elctromagnetic wave power supply 47 was operated under the condition of 13.56 MHz and 1000 W and the temperature of the exposure face 400 of the substrate holder 4 was measured with a fluorescent radiation thermometer, it reached about 250° C.

The silicon oxide film etch rate on the exposure face 400 of the substrate holder 4 was about 250 nm/min under the plasma cleaning conditions of the perfluorocarbon 14 gas flow rate 400 SCCM, the oxygen gas flow rate 100 SCCM, the high-frequency electromagnetic wave power supplied by the power supply mechanism 3, 2000 W, and the high-frequency electromagnetic wave power applied by the substrate high-frequency electromagnetic wave power supply 47, 1000 W, for example.

Figure 4:
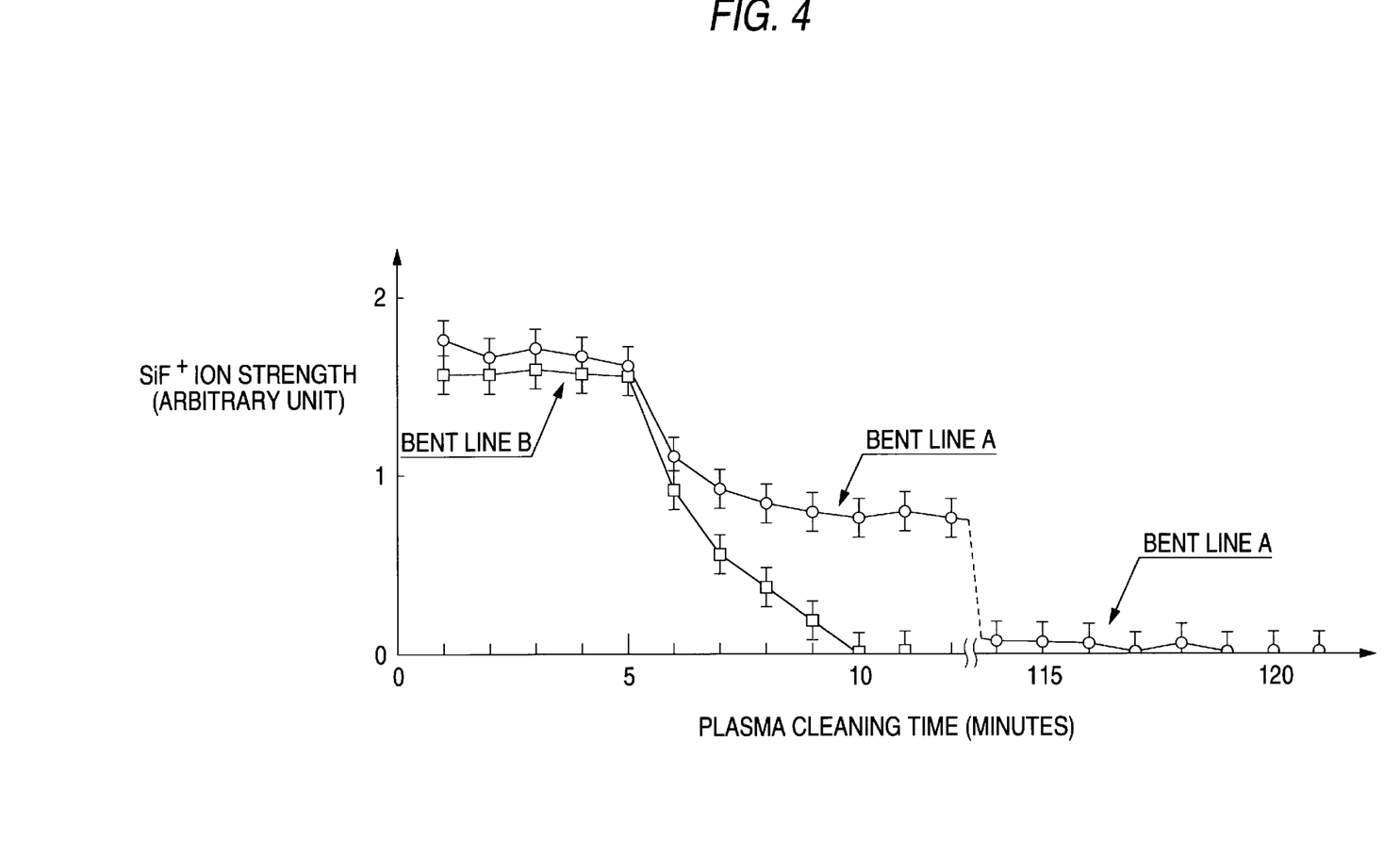
FIG. 4 is a graph showing the results of an experiment testing the effect of an energy application member adopted for the plasma processing system of FIG. 1.

FIG. 4 is a graph showing the results of an experiment testing the effect of the energy application member 46 adopted for the plasma processing system of the embodiment. In the experiment, a remaining gas analyzer (mass filter) was attached to the film depositing chamber 101 for executing a remaining gas analysis in the plasma cleaning. FIG. 4 is a graph showing variation of the silicon fluoride ion strength in the remaining gas with respect to time. In FIG. 4, the vertical axis indicates the amount of silicon fluoride ions (mass/charge amount=33) and the horizontal axis indicates the plasma cleaning elapsed time.

The plasma cleaning was executed after a silicon oxide film 2 $\mu$m thick was deposited on a 6-inch silicon semiconductor substrate. The thickness of the silicon oxide film deposited on the exposure face 400 of the substrate holder 4 after the deposition was 2 $\mu$m equal to the thickness of the film deposited on the surface of the 6-inch silicon semiconductor substrate. The thickness of the silicon oxide film deposited on the inner face of the portion of the film depositing chamber 101 of the vacuum vessel 1 was about 1.6 $\mu$m.

In FIG. 4, bent line A (o marker) indicates strength variation of the silicon fluoride ions in the remaining gas when the conventional plasma processing system shown in FIG. 11 was used, and bent line B (□ marker) indicates strength variation of the silicon fluoride ions in the remaining gas when the plasma processing system of the embodiment shown in FIG. 1 was used.

The bent line A indicates that after the plasma cleaning elapsed time exceeds about five minutes, the silicon fluoride ion strength turns to a moderate downward trend and when the plasma cleaning time exceeds 120 minutes, it becomes zero. This means that when the plasma cleaning was executed for five minutes, the silicon oxide film deposited on the inner face of the vacuum vessel 1 was removed, thus the silicon fluoride ion strength turned to the downward trend and that it took about 120 minutes to remove the silicon oxide film deposited on the exposure face 400 of the substrate holder 4.

In contrast, the bent line B indicates that after the plasma cleaning elapsed time exceeds about five minutes, the silicon fluoride ion strength rapidly decreases and after a lapse of about 10 minutes, it becomes zero. This means that when the plasma cleaning was executed for five minutes, the silicon oxide film deposited on the inner face of the film depositing chamber 101 was removed, thus the silicon fluoride ion strength turned to the downward trend and that when the plasma cleaning time exceeded 10 minutes, the silicon oxide film deposited on the exposure face 400 of the substrate holder 4 was removed. This fact indicates that the plasma processing system of the embodiment reduces the plasma cleaning completion time to about $\frac{1}{12}$ as compared with the conventional plasma processing system.

As described above, the plasma processing system of the embodiment can dramatically enhance the etch rate of the exposure face 400 of the substrate holder 4 formerly hard to be etched and therefore can drastically reduce the time required for the plasma cleaning.

In addition, the high-frequency coil 31 may be replaced by a normal coil or an antenna.

Second Embodiment

Figure 5:
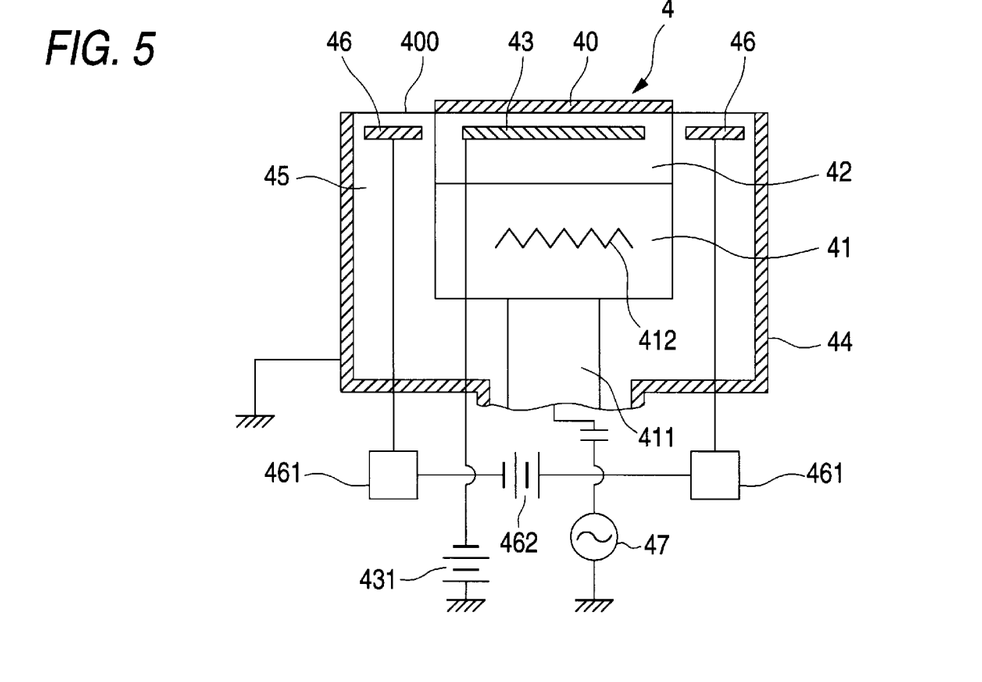
FIG. 5 is a schematic view showing the structure of the main parts of a plasma processing system according to a second embodiment of the invention.

FIG. 5 is a schematic view showing the structure of the main parts of a plasma processing system according to a second embodiment of the invention; it is a schematic sectional view of a substrate holder like FIG. 3.

An energy application member 46 in the second embodiment shown in FIG. 5 is made of an alloy consisting essentially of nickel and chromium, and is energized through filters 461 from an energizing power supply 462.

The filter 461 is a low-pass filter for suppressing invading of the high-frequency electromagnetic wave power component arriving at the energy application member 46 to the energizing power supply 462. Further, the energizing power supply 462 is provided to energize the energy application member 46 for generating heat; an about 500-W DC or AC output power supply is used.

This structure enables the energy application member 46 to be energized for generating heat for raising the temperature of the exposure face 400 of the substrate holder 4. Resultantly, the etch rate of the thin film deposited on the exposure face 400 can be enhanced, thus reducing the plasma cleaning time.

In addition, the energy application member 46 which is energized for generating heat is not limited to the alloy consisting essentially of nickel and chromium. For example, an energy application member 46 made of a material consisting essentially of carbon can also be energized for generating heat.

Third Embodiment

Figure 6:
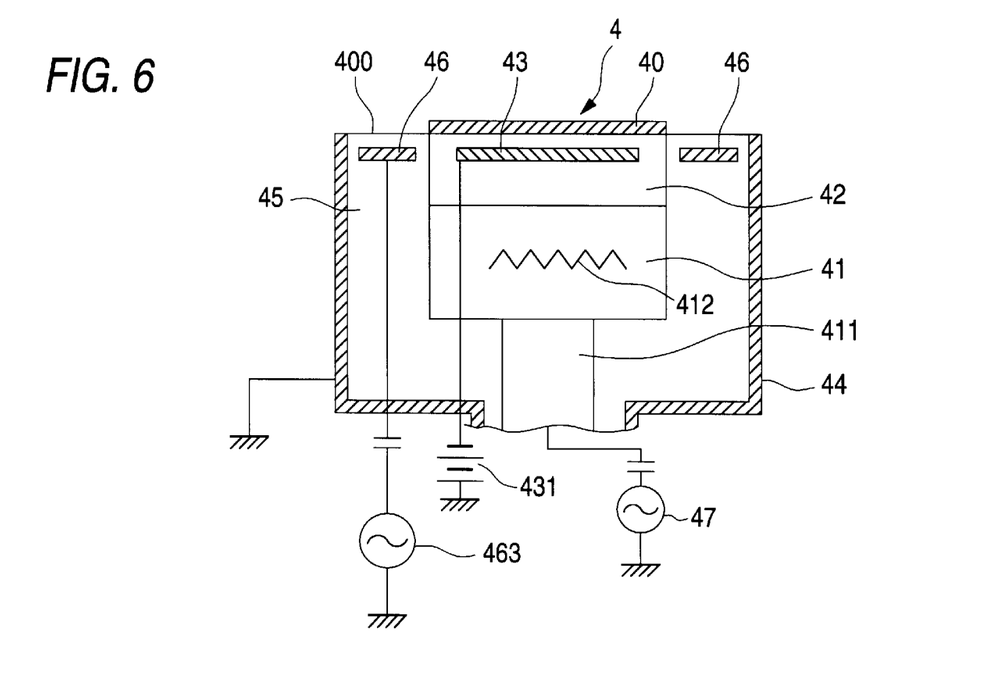
FIG. 6 is a schematic view showing the structure of the main parts of a plasma processing system according to a third embodiment of the invention.

FIG. 6 is a schematic view showing the structure of the main parts of a plasma processing system according to a third embodiment of the invention; it is a schematic sectional view of a substrate holder.

In the third embodiment shown in FIG. 6, an energy application member 46 is formed of an alloy consisting essentially of tungsten, and an exposure face high-frequency electromagnetic wave power supply 463 is connected thereto. For example, a power supply for outputting 13.56-MHz, 500-W high-frequency electromagnetic wave power is used as the exposure face high-frequency electromagnetic wave power supply 463, but the power supply 463 is not limited to it.

In the above structure, when high-frequency electromagnetic wave power is applied from the exposure face high-frequency electromagnetic wave power supply 463 to the energy application member 46, the high-frequency electromagnetic wave power is induced through an insulation block 45 to an exposure face 400, which is an insulation material of a substrate holder 4, forming an electric field between the exposure face 400 and the inner face of a vacuum vessel 1 which is grounded. When the electric field is formed on the exposure face 400, ion bombardment is caused by ions in plasma and the etch rate of a thin film deposited on the exposure face 400 can be increased drastically.

The silicon oxide film etch rate on the exposure face 400 was about 800 nm/min under the plasma cleaning conditions of the perfluorocarbon 14 gas flow rate 400 SCCM, the oxygen gas flow rate 100 SCCM, the high-frequency electromagnetic wave power supplied by a power supply mechanism 3, 2000 W, and the high-frequency electromagnetic wave power applied to the energy. application member 46, 300 W, for example; a drastic increase in the etch rate was accomplished.

FIGS. 7 to 10 are illustrations showing other patterns of the energy application member 46 that can be adopted for the plasma processing systems of the first to third embodiments; they are sectional plan views as viewed from the substrate side (top).

Figure 7:
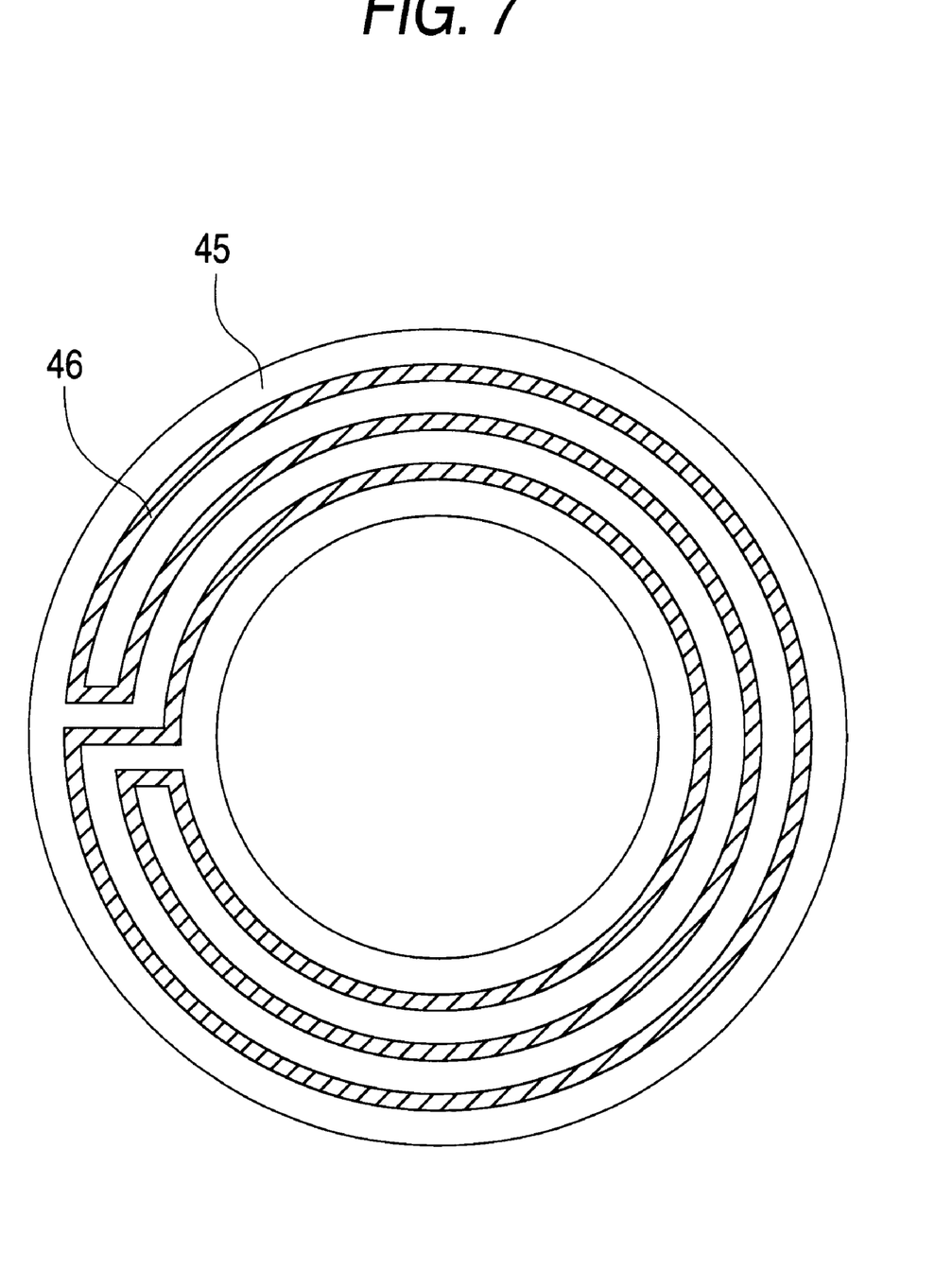
FIG. 7 is an illustration showing another pattern of the energy application member that can be adopted for the plasma processing systems of the first to third embodiments.

For example, the energy application member 46 may be made in the pattern form shown in FIG. 7. In this case, the path through which an induced current flows or the energization path for generating heat can be lengthened, so that the temperature rise can be accelerated.

Figure 8:
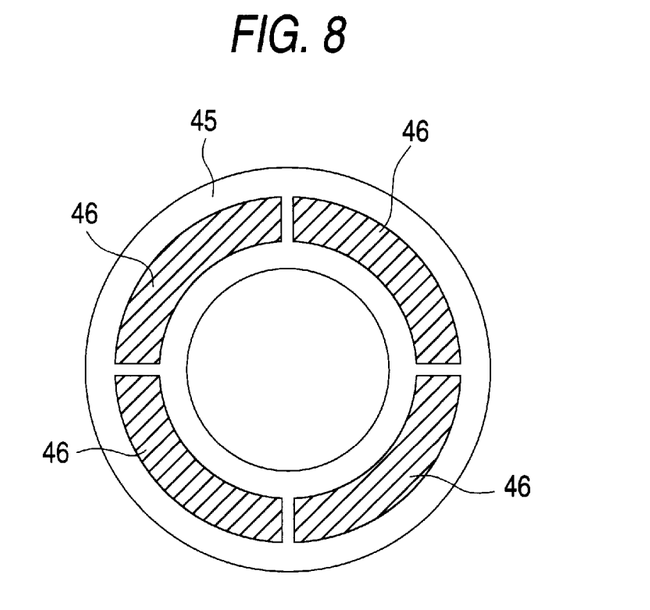
FIG. 8 is an illustration showing another pattern of the energy application member that can be adopted for the plasma processing systems of the first to third embodiments.
Figure 9:
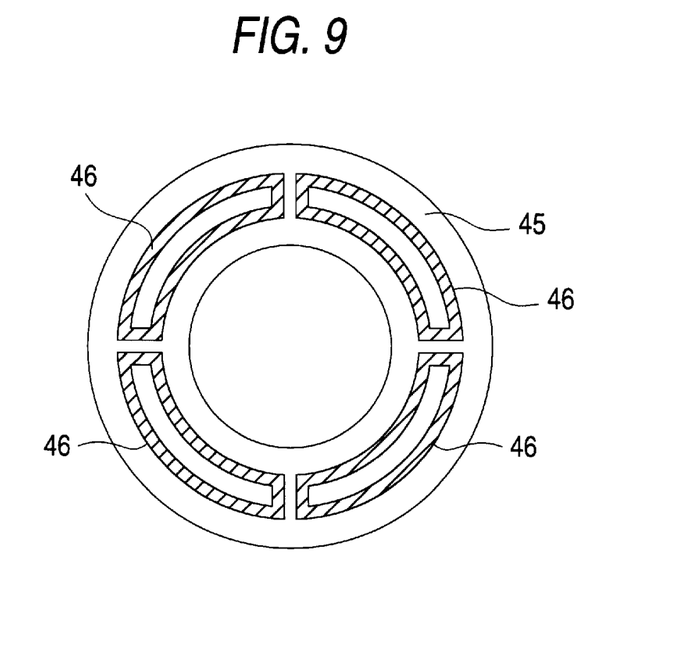
FIG. 9 is an illustration showing another pattern of the energy application member that can be adopted for the plasma processing systems of the first to third embodiments.

Further, as shown in FIGS. 8 and 9, the energy application member 46 may be divided into a plurality of members. In these cases, the patterns are effective when the energy application members 46 is to be made of a material hard 15 to be molded in one piece.

Figure 10:
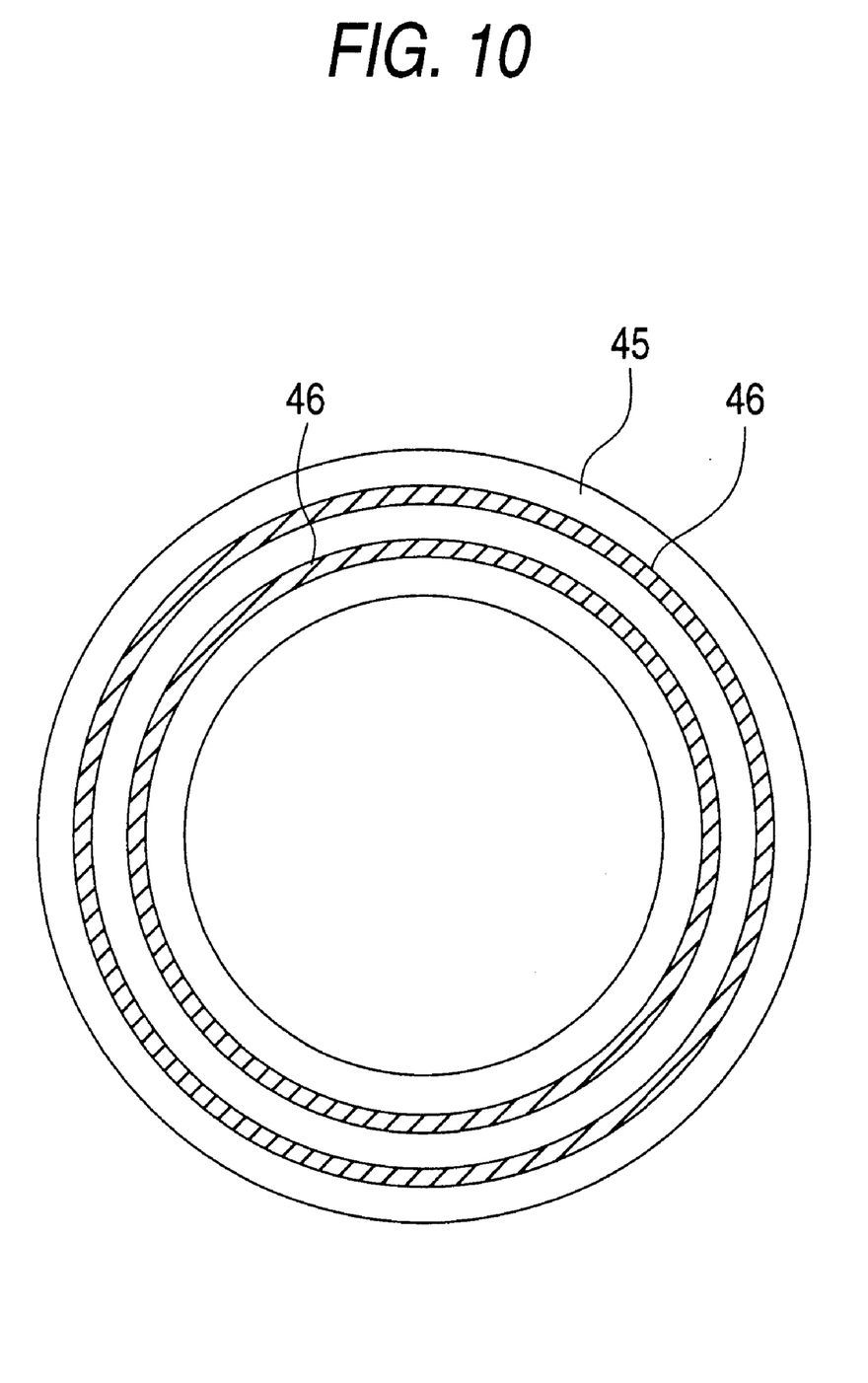
FIG. 10 is an illustration showing another pattern of the energy application member that can be adopted for the plasma processing systems of the first to third embodiments.

Furthermore, as shown in FIG. 10, annular members different in inner and outer diameters may be placed concentrically to form energy application members 46. In this case, the insulation property of the insulation block 45 can also be enhanced.

Additionally, if high-frequency electromagnetic wave power is applied to the holder main body 41 from the substrate high-frequency electromagnetic wave power supply 47 as in the first embodiment shown in FIG. 1, an induced current can be induced to the energy application members 46 for raising the temperature of the exposure face 400 as described above. From the viewpoint of use of plasma processing for a substrate, when high-frequency electromagnetic wave power is applied to the holder main body 41, ions in plasma cause a sputtering phenomenon on the substrate surface; for example, surface processing can be executed for etching the substrate surface or improving the film quality of the surface by ion bombardment.

If energy can be applied to the exposure surface 400 only by the induced current flowing through the energy application member 46 from the substrate high-frequency electromagnetic wave power supply 47, the substrate high-frequency electromagnetic wave power supply 47 can also serve as the exposure face high-frequency electromagnetic wave power supply 463 in the third embodiment shown in FIG. 6. In this case, the high-frequency electromagnetic wave power supplies to be attached to the substrate holder 4 can be united as one unit, thus contributing to a reduction in costs.

Although the PECVD processing for depositing a silicon oxide film on the substrate 40 has been discussed in the description of the embodiments, it is clear that similar effects can be produced also in PECVD processing for depositing an amorphous silicon film on the substrate 40 or dry etching process for the substrate 40.

Additionally, although the examples of using the perfluorocarbon 14 gas as plasma cleaning gas have been discussed, it is clear that similar effects can be produced also in case that perfluorocarbon 116 gas ($C_2F_6$), sulfur hexafluoride gas ($SF_6$), or nitrogen trifluoride ($NF_3$) is used or that argon gas is mixed with oxygen gas. If argon gas is used, argon ions generated in plasma are high in sputtering ratio, so that plasma cleaning can be executed while highly efficient sputtering is performed.

Further, the material of the insulation block 45 is not limited to a ceramic member consisting essentially of aluminum oxide; for example, it may be silica glass or boron nitride deposited by a thermal CVD method.

As described above, according to the invention, when plasma cleaning is executed, etching and removal of a film deposited on the exposure face of the substrate holder can be accelerated, to drastically shorten the entire time required for the plasma cleaning.

What is claimed is:

1. A plasma processing system comprising:

a vacuum vessel provided with an exhaust channel;

a gas introduction mechanism for introducing a predetermined gas into said vacuum vessel;

a power supply mechanism for energizing the introduced gas for forming plasma; and a substrate holder for placing a substrate in a position where the substrate is to be processed with the formed plasma, wherein said gas introduction mechanism is adapted to introduce gas for executing plasma cleaning for plasma etching and removing a thin film deposited on an inner face of said vacuum vessel and an exposure face other than a substrate placement portion of said substrate holder, and wherein said substrate holder includes an energy application member for energizing the exposure face of said substrate holder when the plasma cleaning is executed.

2. The plasma processing system as claimed in claim 1, wherein said power supply mechanism supplies predetermined high-frequency electromagnetic wave power to said vacuum vessel, and wherein said energy application member is formed of a material, through which an induced current flows by the high-frequency electromagnetic wave power supplied by said power supply mechanism, for generating heat.

3. The plasma processing system as claimed in claim 2, wherein said energy application member is embedded below the exposure face of said substrate holder.

4. The plasma processing system as claimed in claim 2, wherein said energy application member is formed of a magnetic alloy.

5. The plasma processing system as claimed in claim 2, wherein said substrate holder is connected to a substrate high-frequency electromagnetic wave power supply for supplying predetermined high-frequency electromagnetic wave power so as to apply a predetermined bias voltage to the substrate.

6. The plasma processing system as claimed in claim 1, wherein said substrate holder further includes a holder main body made of metal, a dielectric block placed on the top of said holder main body, and an insulation block placed so as to cover surroundings of said holder main body and said dielectric block, and wherein said energy application member is embedded in said insulation block.

7. The plasma processing system as claimed in claim 1, wherein said energy application member is made of a material which is energized for generating heat and connected to an energization power supply for energizing said energy application member.

8. The plasma processing system as claimed in claim 7, wherein said energy application member is made of an alloy consisting essentially of nickel and chromium.

9. The plasma processing system as claimed in claim 7, wherein said energy application member is made of a material consisting essentially of carbon.

10. The plasma processing system as claimed in claim 1, wherein said energy application member is connected to an exposure face high-frequency electromagnetic wave power supply for supplying predetermined high-frequency electromagnetic wave power to said energy application member.

11. The plasma processing system as claimed in claim 10, wherein said energy application member is embedded below the exposure face of said substrate holder.

12. The plasma processing system as claimed in claim 10, wherein said substrate holder is connected to a substrate high-frequency electromagnetic wave power supply for supplying predetermined high-frequency electromagnetic wave power so as to apply a predetermined bias voltage to the substrate, said substrate high-frequency electromagnetic wave power supply also serving as said exposure face high-frequency electromagnetic wave power supply.

13. The plasma processing system as claimed in claim 10, wherein said energy application member is made of an alloy consisting essentially of tungsten.

* * * * *